US010228869B1

United States Patent
Nakibly et al.

(10) Patent No.: US 10,228,869 B1
(45) Date of Patent: Mar. 12, 2019

(54) CONTROLLING SHARED RESOURCES AND CONTEXT DATA

(71) Applicant: Amazon Technologies, Inc., Seattle, WA (US)

(72) Inventors: Guy Nakibly, Kedumim (IL); Benzi Denkberg, Etz Efraim (IL); Ofer Frishman, Hod-Hasharon (IL); Erez Izenberg, Tel Aviv (IL); Uri Leder, Lotem (IL); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/716,010

(22) Filed: Sep. 26, 2017

(51) Int. Cl.
| | |
|---|---|
| *G06F 9/48* | (2006.01) |
| *G06F 3/06* | (2006.01) |
| *H04L 12/911* | (2013.01) |
| *G06F 9/50* | (2006.01) |
| *H04L 29/08* | (2006.01) |

(52) U.S. Cl.
CPC .......... *G06F 3/0617* (2013.01); *G06F 9/4831* (2013.01); *G06F 9/5038* (2013.01); *H04L 47/822* (2013.01); *H04L 67/1097* (2013.01)

(58) Field of Classification Search
CPC .................................................. G06F 9/5038
See application file for complete search history.

(56) References Cited

U.S. PATENT DOCUMENTS

| 7,222,222 B1 * | 5/2007 | Vartti | G06F 12/0828 |
| | | | 711/151 |
| 7,337,275 B2 | 2/2008 | Wolrich et al. | |
| 2002/0152328 A1 * | 10/2002 | Kagan | G06F 9/546 |
| | | | 709/250 |
| 2006/0143415 A1 * | 6/2006 | Naik | G06F 12/1466 |
| | | | 711/163 |
| 2006/0161741 A1 * | 7/2006 | Yasue | G06F 9/526 |
| | | | 711/152 |
| 2007/0266196 A1 * | 11/2007 | Torii | G06F 13/1631 |
| | | | 710/309 |
| 2008/0270744 A1 * | 10/2008 | Hashimoto | G06F 13/1673 |
| | | | 711/217 |
| 2013/0042077 A1 * | 2/2013 | Mannava | G06F 12/0831 |
| | | | 711/146 |

(Continued)

OTHER PUBLICATIONS

U.S. Appl. No. 15/716,036, filed Sep. 26, 2017, Titled: Packet Processing Cache.

*Primary Examiner* — Edward J Dudek, Jr.
(74) *Attorney, Agent, or Firm* — Kilpatrick Townsend & Stockton LLP

(57) ABSTRACT

Techniques for controlling access to shared resources may include receiving multiple requests to access shared information associated with an identifier. For each of the requests, an entry in a linked list can be allocated to the request, and each entry can be associated with the identifier. The shared information associated with the identifier can be retrieved, and stored in each entry associated with the identifier. A conflict indicator is set in each entry to indicate whether the shared information is available for the request corresponding to the entry. The shared information stored in each entry is provided for each request after the conflict indicator in the corresponding entry indicates the shared information is available for the request.

21 Claims, 10 Drawing Sheets

(56) References Cited

U.S. PATENT DOCUMENTS

| | | |
|---|---|---|
| 2013/0266021 A1 | 10/2013 | Basso et al. |
| 2014/0181409 A1 | 6/2014 | Manula et al. |
| 2015/0347185 A1* | 12/2015 | Holt ........................ H04L 49/00 718/102 |
| 2018/0019871 A1* | 1/2018 | Gage ..................... G06F 21/606 |
| 2018/0246828 A1* | 8/2018 | Choi ....................... G06F 13/16 |
| 2018/0248813 A1 | 8/2018 | Zheng et al. |

* cited by examiner

CONTROLLING SHARED RESOURCES AND CONTEXT DATA

BACKGROUND

Resource sharing is common in computing systems, where multiple data processing tasks may attempt to access the same set of data. For example, a network interface controller such as an Ethernet controller may execute multiple packet processing tasks of transmitting and/or receiving data packets over a network. The processing of each data packet may require accessing the same set of context data needed to process each packet. As another example, a computer processor may execute multiple processor instructions. The execution of the processor instructions may require accessing the same set of registers. Data contention may arise when multiple processing tasks attempt to access the same shared information simultaneously. In scenarios where multiple processing tasks are involved in updating and reading of the same shared information, a data coherency problem may also arise when, for example, a processing task fails to use the most updated version of the shared information.

BRIEF DESCRIPTION OF THE DRAWINGS

Various embodiments in accordance with the present disclosure will be described with reference to the drawings, in which.

DETAILED DESCRIPTION

Figure 1A:
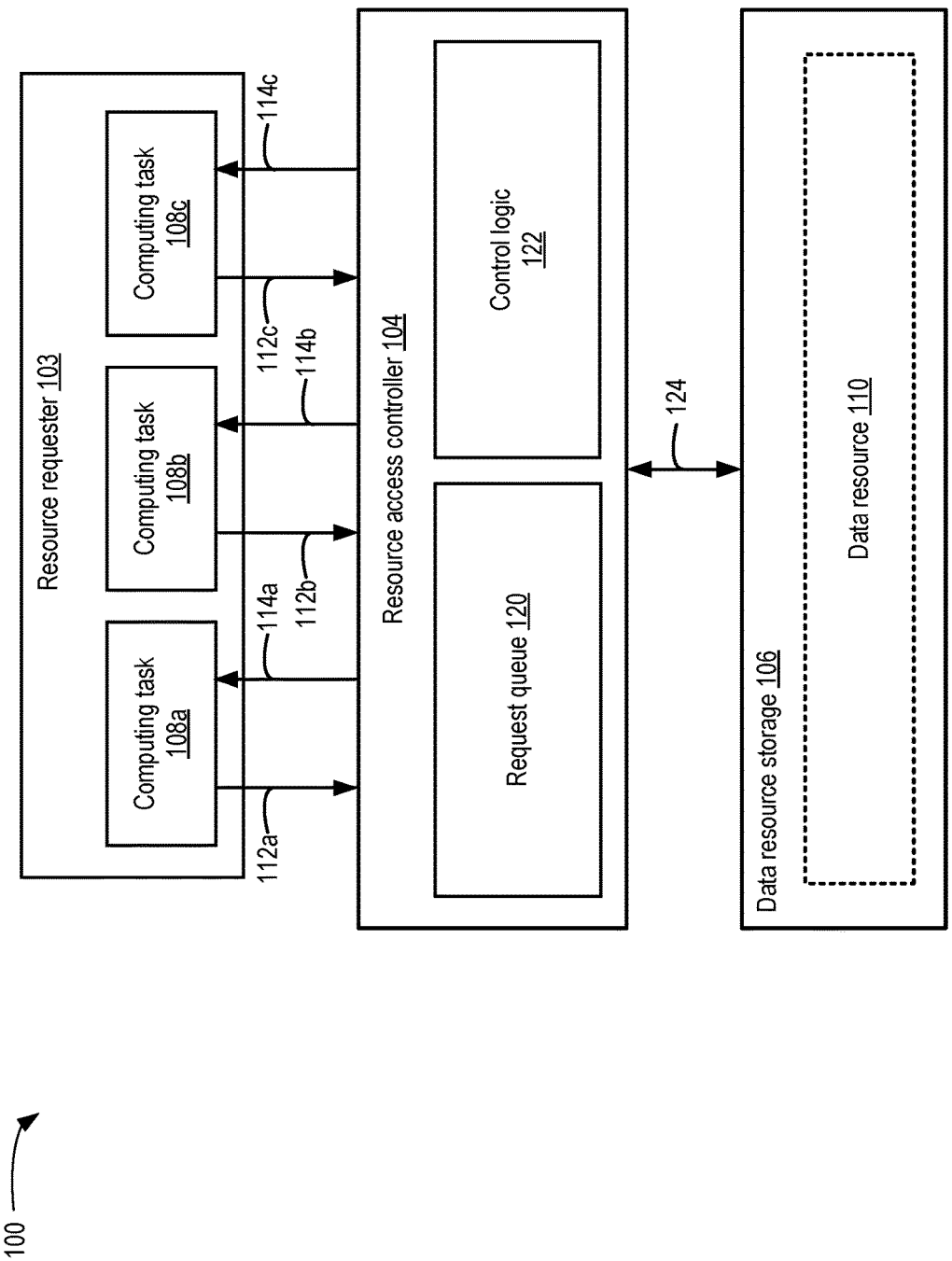
FIG. 1A shows an example of a system for coordinating accesses to shared computing resources, according to certain aspects of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Computing systems often need to provide shared access to the same data resource to multiple computing tasks. For example, a network interface controller (NIC) such as an Ethernet controller may execute a set of packet processing tasks for transmitting and/or receiving data packets. These tasks may access shared context data to generate or to process a data packet. The context data may include, for example, a memory address pointing to a location where packet information is to be stored for a received data packet or where packet information is to be read from to generate a data packet for transmission, a network address associated with a source or destination of the packet, protocol information (e.g., header information) associated with the network protocol of the packet, port information identifying the port for transmission or reception of the packet, a queue pointer such as a head pointer or a tail pointer of a queue (e.g., a ring queue) associated with information used for processing the packet, etc. More generally, context data may include any information that is needed to process a data packet. At least some of the context data can be updated when the packet processing tasks are executed. For example, the address of the memory location where packet payload is stored can be updated for the generation and/or processing of data packets that carry data stored in different memory address locations, the head and tail pointer of a queue storing memory descriptors can be updated after a packet is retired, etc.

The sharing of the context data among the data packet generation and/or processing tasks can lead to data contention problems. For example, a number of packet processing tasks that are executed in parallel (e.g., to transmit and/or receive data packets at multiple ports simultaneously) may attempt to access the same copy of the context data simultaneously. The sharing of the context data can also lead to data coherency problems. For example, as discussed above, two data packet processing tasks may access the same context data, but the processing order of the packets may require the context data to be updated by one packet before the next packet can use the context data. One example of such context data is the head pointer of a ring queue managed by the NIC. In this case, the context data may be updated between the executions of processing the first packet and processing the second (later) packet, so that the second packet should access the context data after it has been updated by the first packet. If the data dependency between the two packets is not taken into account, erroneous context data may be read when processing the second packet.

Data coherency issues can also arise in other contexts. For example, in some embodiments, the data coherency problems may also occur whenever shared data resources are involved. For example, when a processor is executing processor instructions in parallel, the processing order may require shared information such as operand data (e.g., data stored in a register) to be updated by one instruction before the next instruction can operate on the data. As such, the data dependency between execution of the processor instructions should be taken into account to ensure the correct operand data is accessed.

Accordingly, techniques are described for coordinating access to shared data resources when multiple requests are made to the shared data resources. The data resources may be information that is shared between processing tasks, and may include, for example, context data for processing network packets, data stored in opcode registers for execution of processor instructions, etc. The access requests to the shared information may arise out of the execution of various computing tasks including, for example, processing of a network data packet, execution of a processor instruction, etc. The access requests can be received from one or more resource requesters which can be part of, for example, a NIC, a CPU, or other data processing devices, etc. A request queue (e.g., linked list, first-in-first-out buffer (FIFO), or other suitable data structure) can be provided to track the plurality of access requests, and to store a local copy of the requested data (e.g., the shared information such as context data) for each of received access requests. The request queue can also update the local copies of the requested data according to the access requests, and provide the updated local copies to the resource requesters. Moreover, the request queue can store the data dependency resolution status of an access request, and can withhold providing the requested data resource for that access request until the data dependency is resolved.

By providing a local copy of the requested data resource to the resource requesters, the system can provide the data requester with faster access to the requested data resource. Moreover, multiple copies of the requested data can be stored and provided to the processing tasks that request the data, which enables the computing tasks to execute in parallel while mitigating the risk of data contention. Further, by determining and resolving the data dependency among the access requests, data coherency can be improved. As such, the techniques described herein can improve the speed and precision of execution of data processing tasks, and improve the performance of the data processing system that executes these tasks.

FIG. 1A illustrates a system 100 for coordinating accesses to a shared computing resource, according to certain aspects of the disclosure. As shown in FIG. 1A, system 100 includes a resource requester 103, resource access controller 104, and a data resource storage 106. Resource requester 103 can be, for example, a data processor such as a packet processor or a CPU. The data processor can be part of a NIC such as an Ethernet controller configured to process or generate data packets, a microprocessor configured to execute one or more processor instructions, etc.

As shown in FIG. 1A, resource requester 103 can execute one or more computing tasks 108, including computing tasks 108a and 108 as shown in FIG. 1A. Each of the computing tasks 108 may be associated with a data processing task such as, for example, assembling of data packet, processing of a data packet, decoding and/or execution of a processor instruction, etc. Each of computing tasks 108a, 108b, and 108c may require access to certain data resource. For example, in a case where computing tasks 108a-108c are associated with assembling or processing of a data packet, resource requester 103 may need to access context data such as memory address information indicating where the packet data is stored, head pointer information associated with queues that manage memory descriptors, etc. Resource requester 103 may also need to access information to be included in a packet header including, for example, a network address, a network protocol information, a payload type, port information, etc. Further, in a case where computing tasks 108a-108c are associated with decoding of instructions, resource requester 103 may need to access opcode information or other data stored in processor registers such as hardware configuration information.

The shared information (e.g., context data, hardware configuration information, etc.) can be stored as data resource 110 in data resource storage 106. Data resource storage 106 can be, for example, a context memory for storing context data for data packet processing, a processor register for storing opcode information, etc. In some embodiments, data resource storage 106 can implemented using any suitable storage technologies such as SRAM, DRAM, flash memory, hardware registers, latches, etc.

Resource requester 103 can access the context data information and the hardware configuration information from data resource storage 106 via resource access controller 104. For example, referring to FIG. 1A, resource requester 103 may transmit a data access request 112a to resource access controller 104 to access data 114a, for computing task 108a. Responsive to receiving data access request 112a, resource access controller 104 can provide requested data 114a to resource requester 103 (and to computing task 108a). Moreover, resource requester 103 may also transmit a data access request 112b to resource access controller 104 to access data 114b, for computing task 108b. Responsive to receiving data access request 112b, resource access controller 104 can provide requested data 114b to resource requester 103 (and to computing task 108b). Further, resource requester 103 may also transmit a data access request 112c to resource access controller 104 to access data 114c, for computing task 108c. Responsive to receiving data access request 112c, resource access controller 104 can provide requested data 114c to resource requester 103 (and to computing task 108c). Data 114a-114c being requested may correspond to part of data resource 110 stored in data resource storage 106. Data 114a-114c used by the different computing tasks may refer to the same set of information shared amongst the computing tasks (e.g., memory address, pointer information, protocol information, opcode information, etc.).

Resource access controller 104 can coordinate the accesses to data resource 110 requested by data access requests 112a-112c. As shown in FIG. 1A, resource access controller 104 may include a request queue 120 and a control logic 122 for managing request queue 120. As to be discussed in more details below, request queue 120 and control logic 122 can perform one or more operations to provide resource requester 103 with access to data resource 110, while mitigating the risks of data contention and data incoherency. For example, under the control of control logic 122, request queue 120 may obtain the data requested by data access requests 112a-112c via communication 124, and store multiple copies of the requested data, with one copy stored for each of data access requests 112a-112c. Request queue 120 may enable computing tasks 108a-108c to obtain their respective requested data at the same time depending on whether there is any data decencies between the computing tasks 108a-108c, and whether any of the computing tasks 108a-108c require use of the most up to date data.

In some embodiments, control logic 122 may determine that data access request 112a includes a write-back operation to update the shared information (e.g., a memory address or a pointer) to be accessed by data access requests 112b and 112c. Based on this determination, control logic 122 may control request queue 120 to store a local copy of the shared information for data access request 112a, and then update the local copies of the shared information per request 112a before providing the shared information to data access requests 112b and 112c. As such, control logic 122 may control request queue 120 to withhold providing the requested data for data access requests 112b and 112c, until the stored copies of the data have been updated. Control logic 122 can also perform other operations to manage request queue 120, and to interface with resource requester 103, as to be discussed in more details below.

Figure 1B:
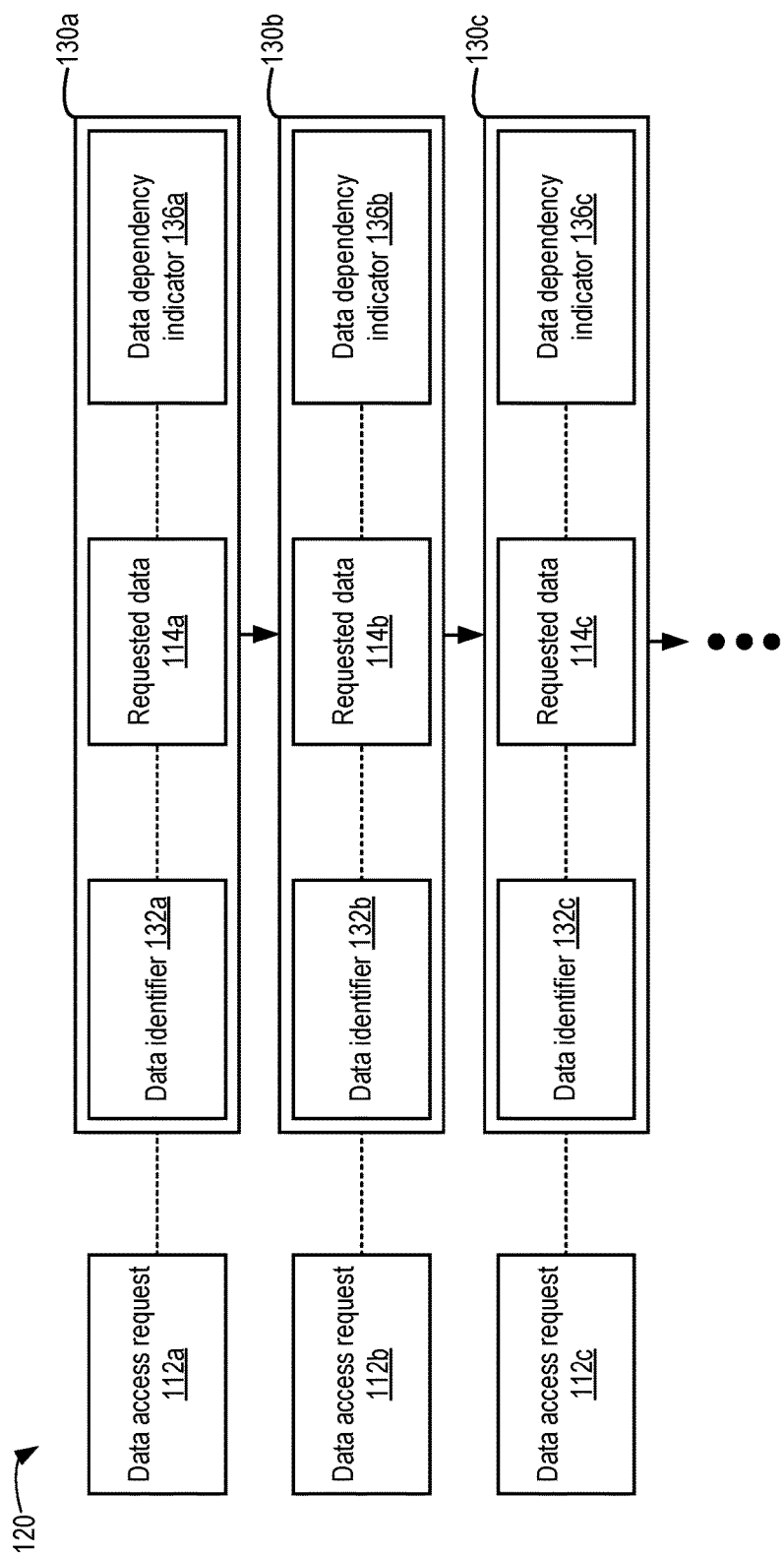
FIG. 1B shows an example of a queue to manage shared computing resources used in the system of FIG. 1A, according to certain aspects of the disclosure.

Reference is now made to FIG. 1B, which illustrates an example of request queue 120 according to certain aspects of the disclosure. As shown in FIG. 1B, request queue 120 includes a plurality of entries 130a, 130b, and 130c. Each of the plurality of entries can be associated with a data access request 112 received from resource requester 103. As discussed above, each of the data access requests 112a-112c can be associated with a particular computing task 108 being executed in resource requester 103. As an illustrative example, each of the data access requests 112 can be associated with the generation or processing of a data packet, the decoding and/or execution of a processor instruction, etc. The plurality of entries 130a-130c can be arranged in a sequential order (e.g., in a queue, FIFO, or linked list, etc.) determined by the order of the data access requests 112 received. In the illustrative example shown in FIG. 1B, data access request 112a is received first, followed by data access request 112b, and then data access request 112c. Although not as shown in FIG. 1B, it should be understood that each of the entries may store other information, such as information indicating whether the entry is the first or last entry of the linked list, information indicating the location of the previous and next entry, etc. For example, entry 130a may store an index indicating the next entry of the linked list is entry 130b, entry 130b may store an index indicating the previous entry of the linked list is entry 130a and an index indicating the next entry of the linked list is entry 130c, etc. In this manner, request queue 120 can be traversed following the order of the received requests.

Each of the plurality of entries can store a data identifier 132 identifying the data being requested, the requested data 114 associated with data identifier 132, and a data dependency indicator 136. Data identifier 132 can be used to identify the data being requested data in data resource storage 106. Data identifier 132 can be included in the data access requests 112 received from resource requester 103, and data access requests directed to the same data will have the same identifier stored in request queue 120 as part of the same linked list. For example, in a case where the resource requester 103 requests context data for processing data packets, data identifier 132 can be a context ID. Requested data 114 includes a copy of the data requested by a respective data access request. For example, referring to FIG. 1B, requested data 114a may include a copy of data requested by data access request 112a, requested data 114b may include a copy of data requested by data access request 112b, whereas requested data 114c may include a copy of data requested by data access request 112c. In the example of FIG. 1B, entries 130a-130c, which are associated with data access requests 112a-112c, can store the same data identifier 132 associated with the shared information being requested, and one or more versions of the same data can be stored in entries 130a-130c as requested data 114a-114c.

After receiving a data access request from resource requester 103, control logic 122 can search request queue 120 for the requested data based on the data identifier included in the request, obtain the requested data stored in request queue 120, and provide the requested data to resource requester 103. For example, control logic 122 can provide requested data 114a as a response to data access request 112a, requested data 114b as a response to data access request 112b, and requested data 114c as a response to data access request 112c. In some cases, control logic 122 can traverse the entries of request queue 120 following the aforementioned sequential order (e.g., entry 130a, followed by entry 130b, and then followed by entry 130c), such that the requested data 114 can be provided (or updated if a data access request includes a write-back operation) following the order of how the corresponding data access requests 112 were received. After providing the requested data to resource requester 103, the entry that stores the requested data can be deleted or invalidated to make room for the next data access request.

There are different ways in which request queue 120 obtains requested data 114. For example, requested data 114 can be acquired from a next level memory (e.g., a main memory such as data resource storage 106) where the requested data is natively stored if the data is not available in request queue 120. If the requested data 114 is already in request queue 120 (e.g., the requested data already exists in a previous entry associated with the same data identifier), the requested data 114 of one entry (e.g., requested data 114b) can be generated by copying the requested data 114 of a previous entry (e.g., requested data 114a) without having to re-access the next level memory. Further, requested data 114 can also be updated based on a write-back operation associated with a previous data access request. As an illustrative example, in a case where computing task 108a-c are associated with processing network packets, data access request 112a (generated for computing task 108a) may include a context data read operation followed by a context data write-back operation to update the context data (e.g., a head pointer to a queue), so that computing tasks 108b and 108c can obtain the updated context data when processing their respective network packets.

Data dependency indicator 136 can provide information indicating whether data dependency exists among the data access requests. The data dependency indicator can be in the form of a conflict indicator or a data hazard indicator. In some embodiments, the data dependency indicator can be a vector whose length corresponds to the number of requests for the shared information. Such data dependency or conflict may exist if a prior data access request (e.g., data access request 112a) includes a write-back operation to modify the data to be accessed by a subsequent data access request (e.g., data access requests 112b and 112c). In this illustrative example, after populating request queue 120 with data access requests 112a-112c, control logic 122 can set the data dependency indicator 136 stored in each of the entries 130b and 130c, to indicate that each of data access requests 112b and 112c depends on the completion of the write-back operation for data access request 112a. After the write-back operation completes, the requested data 114b and 114c can be updated with the new data. The data dependency indicators 136b and 136c can also be updated to indicate that the data dependencies of data access requests 112b and 112c have been resolved upon completion of data access request 112a. In the absence of the data dependency between data access requests 112b and 112c, control logic 122 may provide requested data 114b and 114c simultaneously to resource requester 103 (after the dependency on data access request 112a has been resolved), which enables the computing tasks that request these data (e.g., computing tasks 108b and 108c) to be executed in parallel.

As discussed above, data dependency indicator 136 may exist in different forms. In one example, data dependency indicator 136 may include a vector or a set of data hazard indicators (or conflict indicators), each of which corresponding to one entry (and the data access request associated with that entry). In the illustrative example of FIG. 1B, if request queue 120 includes only three entries for storing three data access requests, each of data dependency indicators 136a, 136b, and 136c may include three data hazard bits. Each of three data hazard bits may correspond to, respectively, entries 130a, 130b, and 130c. The data hazard bits can be set based on a sequence of receiving the data access requests, and the read/write operations included in the data access requests, to indicate any data dependency that may exist among the data access requests. As an illustrative example, entry 130b may store a first data hazard bit that corresponds to entry 130a and indicates any data dependency of entry 130b on entry 130a. Control logic 122 can provide the data stored in an entry, or withhold providing of the data stored in that entry, based on whether the data dependency of the data access request associated with that entry has been resolved according to a value of the data hazard bits stored in that entry. By way of example, referring to FIG. 1B, if the value of each of the data hazard bits stored in entry 130a equals to one, control logic 122 can determine that the data dependency of data access request 112a has been resolved, and requested data 114a can be provided to resource requester 103. On the other hand, if the value of any of the data hazard bits stored in entry 130a equals to zero (or any value other than one), control logic 122 can determine that the data dependency of data access request 112a has not been resolved, and withhold providing requested data 114a to resource requester 103.

Figure 2A:
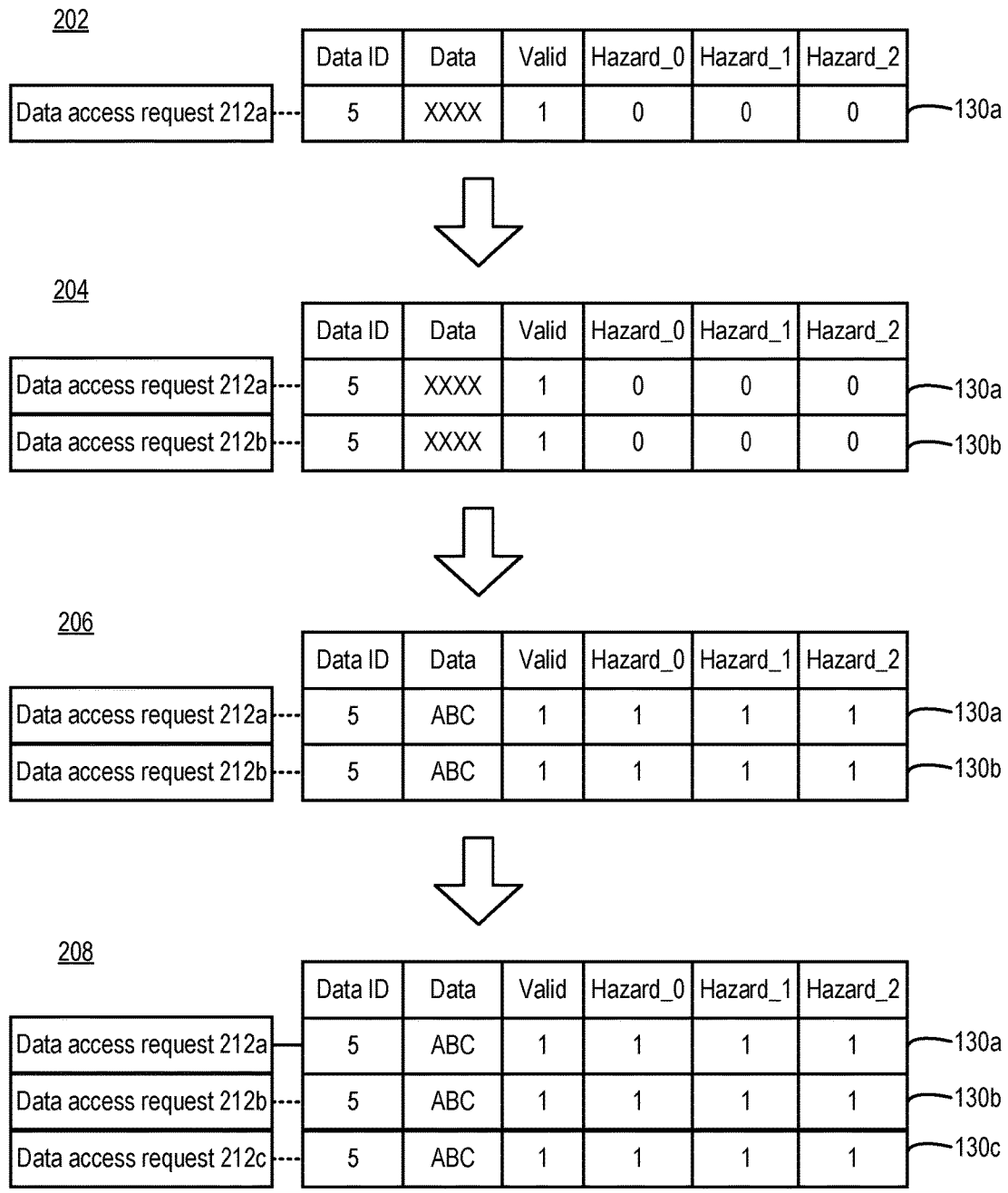
FIG. 2A shows examples of operations performed on a queue for coordinating access to shared resources, according to certain aspects of the disclosure.
Figure 2B:
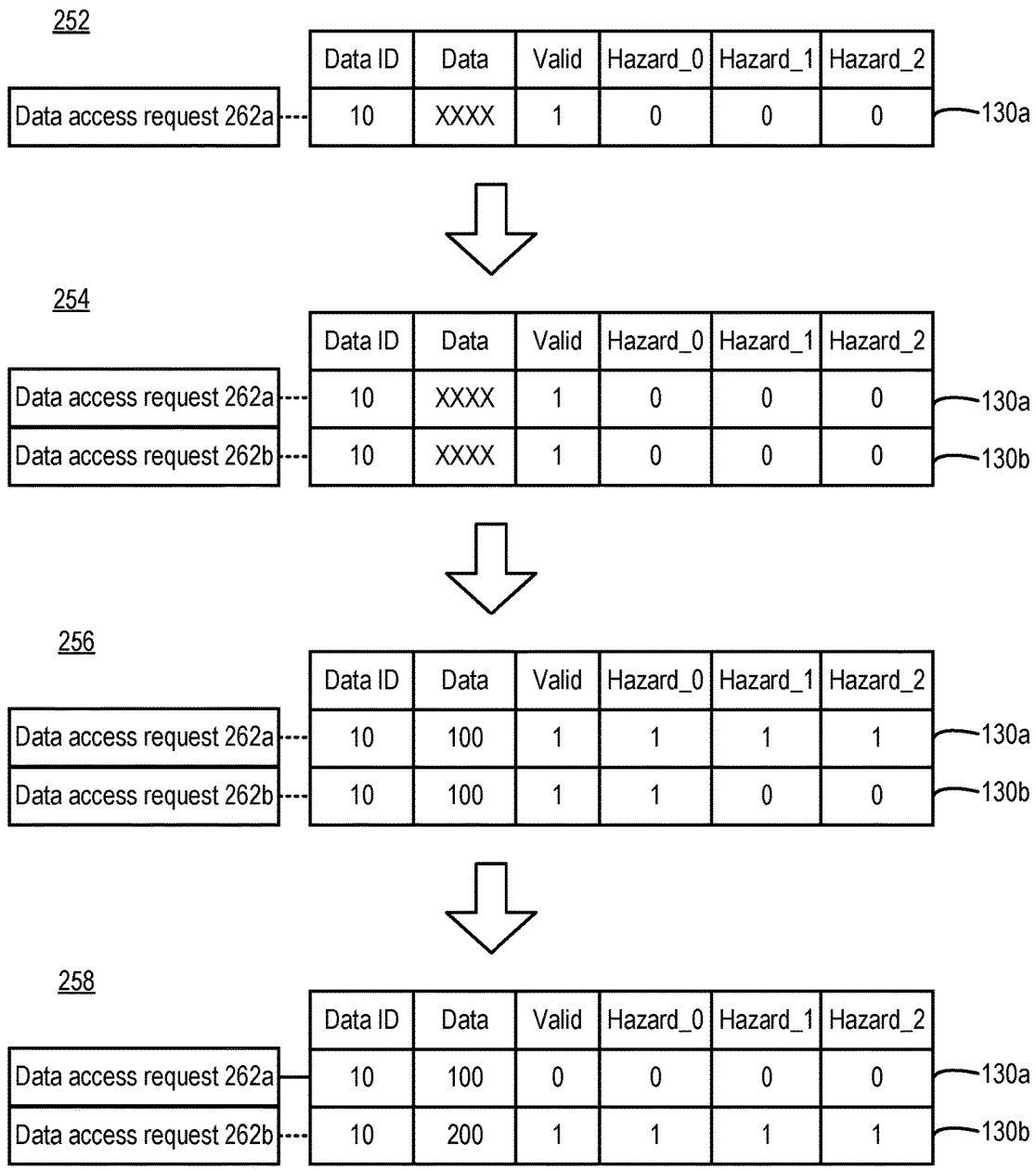
FIG. 2B shows other examples of operations performed on a queue for coordinating access to a shared resources, according to certain aspects of the disclosure.

Reference is now made to FIGS. 2A and 2B, which illustrate example operations performed on request queue 120, according to certain aspects of the disclosure. FIG. 2A illustrates the changes of the content of a three-entry request queue 120 over time for a set of data access requests involving read operations in which the data requests do not require the most updated data (e.g., the data requests do not have any data dependency on each other). As shown in FIG. 2A, entry 130a of request queue 120 may include data identifier 132 ("data ID"), requested data 114 ("data"), a valid bit, and data hazard bits "hazard_0," "hazard_1," and "hazard_2" that are part of data dependency indicator 136. The valid bit can be set to one when the entry is first allocated to a data access request to be processed. Each of the three hazard bits corresponds to, respectively, one entry of the three-entry request queue 120. For example, hazard bit "hazard_0" may correspond to the first entry in the queue, hazard bit "hazard_1" may correspond to the second entry in the queue, whereas hazard bit "hazard_2" may correspond to the third entry in the queue.

At time 202, request queue 120 receives the first data access request 212a from resource requester 103. Data access request 212a may be associated with, for example, a computing task for assembling a data packet for transmission, and the data access request can be requesting network protocol information to be included in the data packet. In this example, the network protocol information may be part of context data associated with a data identifier (data ID) of "5." The data identifier can be included in data access request 212a. Upon receiving data access request 212a, request queue 120 (and/or control logic 122) may determine that none of its entries has a data identifier with a value of "5," and determine that the requested data is not currently available in request queue 120. Subsequently, request queue 120 may transmit a request including the data identifier to the next level memory device (e.g., data resource storage 106) to obtain the requested data. Request queue 120 can also allocate entry 130a, set its valid bit to 1, and associate entry 130a with data access request 212a. Because the requested data is not currently available in requests queue 120, the data hazard bits in entry 130a are set to 0 to indicate that the data hazard for access request 212a has not been resolved yet.

Referring back to FIG. 2A, before receiving the requested data from the next level memory device, at time 204, request queue 120 may receive data access request 212b. Data access request 212b may also be associated with, for example, a computing task for assembling a data packet for transmission, and the data access request is for the network protocol information to be included in the data packet. Based on the context data identifier included in the request, request queue 120 determines that data access request 212b is requesting the same network protocol information (associated with data ID of "5"). Request queue 120 can allocate entry 130b as the next entry to be processed after entry 130a, and set the valid bit of entry 130b to be one. Request queue 120 also associates data access request 212b with entry 130b. At time 204, the first entry (head entry) of request queue 120 remains as entry 130a, and the second entry of request queue 120 is entry 130b. Hazard bit "hazard_1" may correspond to data access request 112b associated with entry 130b. The values of the hazard bits "hazard_0," "hazard_1," and "hazard_2" of entry 130b can also be set to zero to indicate that any data stored in entry 130b at time 204 is not available and should not be provided to resource requester 103.

At time 206, request queue 120 receives the requested data (e.g., context data associated with a data ID of "5") from data resource storage 106, and store copies of the data in each of entries 130a and 130b. For example, as shown in FIG. 2A, request queue 120 receives the requested data with value "ABC" and stores the data in entries 130a and 130b. In the example shown in FIG. 2A, request queue 120 (and/or control logic 122) may determine that data access request 212a is for accessing network protocol information (e.g., based on the data identifier included in data access request 212a), and that the accessed information will not be updated between data access request 212a and the access requests that follow (e.g., no data dependency between the requests). In such a case, request queue 120 does not need to lock the value of hazard bit for the other entries of request queue 120 when those entries are allocated. As such, once the requested data is obtained for access request 212a, the hazard bits of both entries 130a and 130b can be set to 1, to indicate that both data access requests 112a and 112b have no data dependency between each other, and that the data hazard for the requested data has been resolved because the requested data is now available in the queue. Accordingly, request queue 120 can provide two copies of data ("ABC") to resource requester 103 as the responses to, respectively, data access requests 212a and 212b.

In some embodiments, request queue 120 can also provide the memory addresses (or index-based identifiers) of entries 130a and 130b, as well as the hazard bits values of each of the entries, to control logic 122. Control logic 122 can then determine whether the hazard bits indicate there exist data dependencies on other data access requests. Upon determining that the data dependencies have been removed for a particular entry, control logic 122 can refer to the memory address (or the index-based identifier) of that entry to obtain the data stored in that entry, and provide the data as a response to the data access request associated with that entry. In the example show in FIG. 2A, at time 206, control logic 122 may obtain the memory addresses (or the index-based identifiers) of entries 130a and 130b, determine (based on the values of the hazard bits) that the data dependencies for both entries have been removed, and provide the data stored in both entries ("ABC") as responses to data access requests 212a and 212b.

In some embodiments, control logic 122 can also provide the memory addresses (or the entry indices) of entries 130a and 130b together with the hazard bit values stored in those entries to resource requester 103 in response to data access requests 212a and 212b. Resource requester 103 can associate these data access requests with the received entry indices of entries 130a and 130b, and with the hazard bit values stored in these entries. Resource requester 103 can then determine whether the data dependency of these data access requests has been resolved based on the associated hazard bit values. If resource requester 103 determines that the data dependency has been resolved for one of the data access request (e.g., data access request 212a), resource requester 103 can transmit the entry index of the associated entry (e.g., entry 130a) back to control logic 122, which can then retrieve the data stored in the associated entry from request queue 120 and provide the data back to resource requester 103.

At time 208, before resource access controller 104 provides the stored data for data access requests 212a and 212b, request queue 120 may receive data access request 212c. Data access request 212c may also be associated with, for example, a computing task for assembling a data packet for transmission, and the data access request is also for network protocol information to be included in the data packet. Request queue 120 can allocate an entry (entry 130c) for data access request 212c as the third entry of the queue. Moreover, based on the data identifier included in the request, request queue 120 determines that data access request 212c is directed to the same network protocol information (associated with data ID of "5"). Request queue 120 can determine that data associated with data ID of "5" is already stored in a previous entry of the queue (e.g., entries 130a and 130b). Based on this determination, request queue 120 can copy the data stored in the previously entry of the queue (entry 130b), and store the copy in entry 130c. Request queue 120 can also set the hazard bits of entry 130c to indicate there is no data dependency for data access request 212c. Request queue 120 (or control logic 122) can then provide the data stored in entry 130c as responses to data access requests 212c. After providing the data to resource requester 103 for the respective requests, request queue 120 can invalidate entries 130a, 130b, and 130c by setting their valid bits to zero. Request queue 120 can then reallocate these entries with subsequent data access requests, and populate them with data IDs and requested data.

Reference is now made to FIG. 2B, which illustrates the changes of the content of request queue 120, with respect to time, for a set of data access requests involving data dependencies. At time 252, request queue 120 receives a data access request 262a from resource requester 103. Data access request 262a may be associated with, for example, a computing task for assembling a data packet for transmission, and the data access request can be for a head pointer for a queue storing memory descriptors used for processing the data packet. The data access request may include a read operation to the context data, followed by a write-back operation to update the head pointer. Another computing task can then access the updated head pointer to obtain information such as memory descriptors to assemble another data packet. In this example, the head pointer may be part of context data information associated with a data ID of "10." The data identifier can be included in data access request 262a and can be extracted by request queue 120 (and/or control logic 122). In this example, request queue 120 (and/or control logic 122) may determine that none of its three entries stores a data identifier with a value of "10," and determine that request queue 120 does not have the requested data. Subsequently, request queue 120 may transmit a request including the data identifier to the next level memory device (e.g., data resource storage 106) to obtain the requested data. Request queue 120 can also allocate entry 230a, set its valid bit to 1, and associate entry 230a with data access request 262a. At that time point, the first entry of request queue 120 can be entry 230a, and hazard bit "hazard_0" may correspond to data access request 262a associated with entry 230a.

At time 252, the values of the hazard bits "hazard_0," "hazard_1," and "hazard_2" can be set to zero, to indicate that the data hazard is not resolved because the requested data is not available in request queue 120. Request queue 120 (and/or control logic 122) can also determine that data access request 262a includes a read operation followed by a write-back operation to the context data information associated with the data ID of "10," and determine that all subsequent access requests directed to context data information associated with this data ID will be suspended, until the write-back operation of data access request 262a completes. Request queue 120 (and/or control logic 122) can lock the value of hazard bit at zero for all other entries of request queue 120 when those entries are allocated. Request queue 120 (and/or control logic 122) can later set the hazard bit to one to remove the data hazard for the respective entry when the write-back operation of data access request 262a completes to indicate the data hazard for the respective entry has been resolved.

Before receiving the requested data from the next level memory device, at time 254, request queue 120 may receive data access request 262b. Based on the context data identifier included in the request, request queue 120 determines that data access request 262b is also for a head pointer associated with a data ID of "10." Request queue 120 can allocate entry 230b as the next entry to be processed after entry 230a, and set the valid bit of entry 130b to be 1 as well. Request queue 120 associates data access request 262b with entry 130b. At time 254, the first entry (head entry) of request queue 120 remains as entry 130a, and the second entry of request queue 120 is entry 130b. Therefore, hazard bit "hazard_1" may correspond to data access request 262b associated with entry 130b. The values of the hazard bits "hazard_0," "hazard_1," and "hazard_2" of entry 130b can also be set to zero, to indicate that the data hazard for the requested data has not yet been resolved. The "hazard_1" bit of data access request 262b is locked at zero until the write-back operation associated with data access request 262a completes.

At time 256, request queue 120 receives the requested data (e.g., context data associated with a data ID of "10") from data resource storage 106, and store copies of the data in each of entries 230a and 230b. For example, as shown in FIG. 2B, request queue 120 receives the requested data (head pointer value of "100"), and stores the data in entries 130a and 130b. The hazard bits "hazard_0," "hazard_1," and "hazard_2" of entry 230a can be set to 1 to indicate that the data stored in entry 130a can be provided to resource requester 103 to service access requests 262a. However, the "hazard_1" bit of data access request 262b remains locked at zero until the write-back operation of data access request 262a completes.

At time 258, request queue 120 can perform the write-back operation of data access request 262a. For example, after processing the packet associated with access request 262a, the head pointer may be updated to a new value of "200." To perform the write-back operation, request queue 120 can invalidate entry 230a (e.g., by setting its valid bit and hazard bits to zero) after providing the data stored in entry 230a to resource requester 103 to service access requests 262a. Request queue 120 can then set entry 130b to be the head entry of request queue 120, and update the data stored in entry 130b with the new data ("200") to complete the write-back operation. In some embodiments, the new data is written to all remaining entries of request queue associated with the same data ID. The lock on the "hazard_1" bit in entry 130b can then be removed to indicate that the data hazard of data access request 262b resulting from its data dependency on access request 262a has been resolved. Request queue 120 (or control logic 122) can then provide the updated value stored in entry 130b to resource requester 103 to service data access request 262b. Control logic 122 can also initiate a write-back operation to update the data resource 110 stored at data resource storage 106, by updating the head pointer value associated with a data ID of "10" to "200." The lock on the "hazard_2" bit in entry 130b can also be removed because entry 130b now stores the most updated head pointer value.

Figure 3:
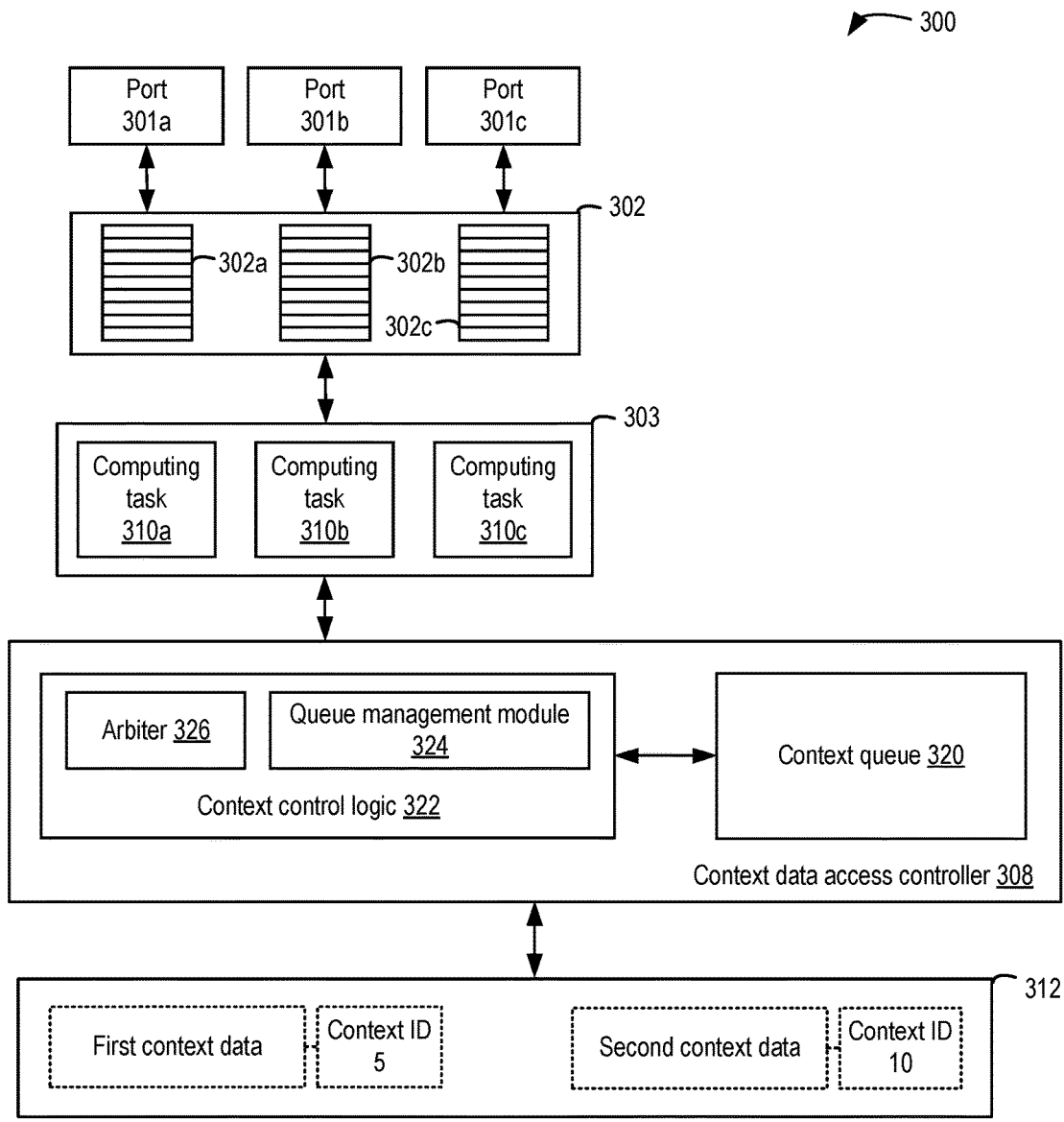
FIG. 3 shows an example of a system for coordinating access to context data for packet processing, according to certain aspects of the disclosure.

FIG. 3 illustrates a system 300 for coordinating accesses to shared context data, according to certain aspects of the disclosure. System 300 can be part of a network interface controller (NIC) that includes one or more network ports 301 (e.g., Ethernet ports). Each of network ports 301 (e.g., 301a, 301b, and 301c as shown in FIG. 3) can be coupled to a data communications network, and may be used to transmit or receive network data packets over the network. System 300 can coordinate accesses to shared context data for generating the packets to be transmitted, or for processing the packets that have been received at the network ports.

As shown in FIG. 3, system 300 further includes task queues 302 for storing packet generation/processing tasks for each of network ports 301. For example, system 300 may include a task queue 302a for port 301a, a task queue 302b for port 301b, and a task queue 302c for port 301c. Computing task queues 302 can store, for example, a computing task for processing a data packet received or a computing task for generating a data packet to be transmitted at the corresponding port 301. Computing task queues 302 can be configured as First-In-First-Out (FIFO) buffers, with the tasks executed in the order they are received. Once the computing task is executed, the computing task can be removed from the queue. In some embodiments, the length of computing task queue 302 can be configured based on the latency in executing a task, and a number of tasks expected to be initiated during that latency period to enable system 300 to store the new tasks waiting to be executed while executing the older tasks. System 300 further includes a data processor 303. Data processor 303 may include a multi-thread task execution unit which can execute multiple computing tasks associated with generation or processing of data packets in parallel. For example, data processor 303 may implement individual datapath for each of network ports 301 or may implement processing pipelines for network ports 301.

Both computing task queues 302 and data processor 303 can operate with context data access controller 308 to process a data packet received from any of ports 301, or to generate a data packet for transmission at any of ports 301. For example, after port 301a receives a data packet, a computing task (e.g., computing task 310a) can be inserted in one of computing task queues 302 for processing the received data packet. Data processor 303 can acquire computing task 310a from computing task queues 302 for execution, and execute the task. During the execution, data processor 303 may acquire context data for processing the received data packet (e.g., memory address for storing the payload data of the received data packet, head pointer to a memory descriptor queue, protocol information, etc.). For example, data processor 303 can use the requested memory address to perform, for example, an direct memory access (DMA) operation to store the payload data when executing computing task 310a. Data processor 303 can also transmit a notification to a target device for the data packet (e.g., a virtual machine) about the storing of the payload data. After the execution of computing task 310a completes, computing task 310a can be removed from computing tasks queues 302.

A computing task (e.g., computing task 310b) can also be inserted in one of computing task queues 302 for generation of a data packet for transmission at any of ports 301, which is then executed by data processor 303. Data processor 303 can obtain context data (e.g., the memory address where the data payload data is stored, etc.), obtain the data payload (e.g., by performing a direct memory access operation), and generate a data packet including the data payload. After the data packet is transmitted, computing task 310b can be removed from computing tasks queues 302.

As discussed above, the execution of computing tasks 310 can generate a context data request for accessing context data for processing the incoming or outgoing data packet. The context data can include, for example, a memory address pointing to a location where packet information is stored, a network address associated with a source or destination of the packet, protocol information (e.g., header information) associated with the network protocol of the packet, port information identify the port for transmission or reception of the packet, a queue pointer such as a head pointer or a tail pointer of a queue (e.g., a ring queue) associated with information used for processing the packet, or other information that is needed to process a data packet. Each context access request may include a read operation to the context data, and/or a read operation followed by a write-back operation to the context data. For example, a context access request for network protocol information may include a read operation, whereas a context access request for a memory address or a head/tail pointer may include a read operation followed by a write-back operation to enable the context data to be updated between the processing and/or generation of different data packets. In some cases, a computing task 310 (e.g., computing task 310a) can determine which operations are to be included in a context access request based on, for example, parsing a packet header. For example, the packet header may indicate that a data packet is received (versus, for example, a control packet), and that system 300 is to store the packet payload data at a memory address. In that case, the computing task may transmit a context access request that includes a read operation followed by a write-back operation to a memory address stored in the context data, so that another computing task (e.g., computing task 310b) processing another data packet can store the payload data at a different memory address.

System 300 also includes a context memory 312 to store the context data. The context data can also be associated with a context ID in context memory 312. For example, as shown in FIG. 3, context memory 312 may store a first context data associated with a context ID of "5," and a second context data associated with a context ID of "10." Different context IDs can be used to identify different types of context information. For example, the first context data can be network protocol information, whereas the second context data can be a memory address for packet payload data.

System 300 further includes a context data access controller 308 which can coordinate the accesses to the context data among the computing tasks 310 (e.g., packet processing tasks) being executed in data processor 303. Context data access controller 308 may include context queue 320 and context control logic 322, and can perform similar functionalities as resource access controller 104 of FIG. 1A. For example, context queue 320 can store a number of entries. Each entry can be associated with a context data access request received from one of computing tasks 310, and can store a copy of context data requested by the context access request. Each entry of context queue 320 can store a data hazard indicator or conflict indicator such as a set or vector of data hazard bits, each of which corresponding to one entry (and the context access request associated with that entry). The set of hazard indicators can be updated to indicate whether a particular context access request has data dependency on other context access requests. For example, as discussed above, a context access request may include a read operation to context data, followed by a write-back operation to update that context data. Context data access controller 308 can withhold providing the stored copy of context data for a subsequent context access request based on the set of data hazard indicators stored in context queue 320 until the write-back operation completes. On the other hand, in the absence of data dependency, or when the write-back operation completes, context data access controller 308 can provide, to data processor 303, copies of context data stored context queue 320. In scenarios where the requested context data is not stored in context queue 320, context data access controller 308 can obtain the requested context data from context memory 312, and store copies of the requested context data in context queue 320.

Context control logic 322 can perform operations with context queue 320 to coordinate the accesses to the context data in a similar manner as context control logic 122 and request queue 120 as described with respect to FIG. 2A and FIG. 2B. As shown in FIG. 3, context control logic 322 includes a queue management module 324, and an arbiter 326. Queue management module 324 can manage the allocation of entries in context queue 320 as well as the association of the entries with the context access requests. Queue management module 324 can also control context queue 320 to obtain requested context data from context memory 312 and store copies of the context data in the entries of context queue 320, and provide the stored copies to data processor 303. Queue management module 324 can also determine whether a context access request received from data processor 303 includes a read operation, or includes a read operation followed by a write-back operation (e.g., based on the context ID included in the context access request, and/or parsing header information of a data packet, etc.). As discussed above with respect to FIG. 2B, in scenarios where the context access request includes a write-back operation, queue management module 324 can instruct context queue 320 to lock the value of the data hazard bit corresponding to that context access request in other entries to zero, so that subsequent context access requests directed to the same context data will be withheld, until the write-back operation completes. Queue management module 324 can also instruct context queue 320 to write back updated context data to context memory 312.

When a computing task is received (e.g., a packet processing task associated with the reception or transmission of a network data packet on a network port), the network port in conjunction with data processor 303 can request context data access controller 308 to allocate an entry in context queue 320 for processing the network data packet. Queue management module 324 can allocate an entry in context queue 320 for the network data packet being processed. Context control logic 322 can manage when the requested context data is read from the context queue (e.g., by monitoring a data hazard indicator associated with the entry) to allow execution of the computing task. In some embodiments, during the processing of a network data packet, the same context data can be read from the context queue multiple times. In such embodiments, only one entry for the requested context data associated with the network data packet need to be allocated in context queue 320, and the data hazard indicator for the entry can be used to indicate when the context data is ready for consumption each time the context data is needed to process the data packet. When the processing of the data packet enters the last stage of processing, data processor 303 may request an update of the context data (e.g., if processing the data packet involves a write-back of the context data), and queue management module 324 can remove the entry from context queue 320 upon the data packet being retired from the datapath.

To facilitate management of context queue 320, after allocating an entry for a context access request in context queue 320, context control logic 322 and/or data processor 303 can receive information identifying the entry (e.g., a memory location, an entry index, etc.) from context queue 320. As discussed above, context control logic 322 can also monitor the data hazard bits associated with that entry. When the data hazard bit stored in that entry become one, which indicates that the context access request associated with that entry has no data hazard (data dependency on other context access requests has been resolved), queue management module 324 can obtain the context data stored in that entry from context queue 320 (e.g., by traversing through context queue 320 to search for the memory location or entry index associated with that entry), and provide the requested context data to data processor 303. In some embodiments, the data hazard bits (e.g., data hazard vector) associated with the context data are provided to each of the network ports such that each port can decide when the requested context data is ready to be read. In other words, for requests from any port that are requesting the same context data, the same hazard vector can be provided for each of the requests. The hazard vector provided for each of the requests may include hazard indicators for all the requests (e.g., each hazard indicator in the vector may correspond to one of the requests to indicate whether a data hazard for that request is resolved). In this manner, regardless of which port a particular the request is for, any of the request can be made aware of when the requested context data for any of the requests is available.

Arbiter 326 can determine the order by which context control logic 322 processes the context access requests. For example, when there are multiple incoming packet processing tasks pending for multiple network ports, arbiter 326 can arbitrate between the network ports and decide the order in which to allocate the entries in context queue 320. Arbiter 326 can also arbitrate between different requests for reading the context data from context queue 320 and different requests for updating the context data as the packet processing tasks are being executed. For example, arbiter 326 can monitor the hazard indicator associated with an entry to schedule and determine the order in which access requests (e.g., read or write) to the context data is serviced.

After receiving the context data from context data access controller 308, data processor 303 can provide the context data to computing tasks 310 to complete their executions, as discussed above. As an illustrative example, the context data may include a virtual memory address for storing packet payload data, as well as a memory address translation table that translates the virtual memory address to a physical memory address. As part of the execution of computing tasks 310, data processor 303 may perform direct memory access to store the packet payload data extracted from a data packet (received at one of network ports 301a-301c), and notify a recipient device (e.g., a virtual machine) to obtain the stored data from the memory. Data processor 303 can then remove the computing tasks associated with processing of the data packet from computing task queues 302 (e.g., retire the packet).

Figure 4:
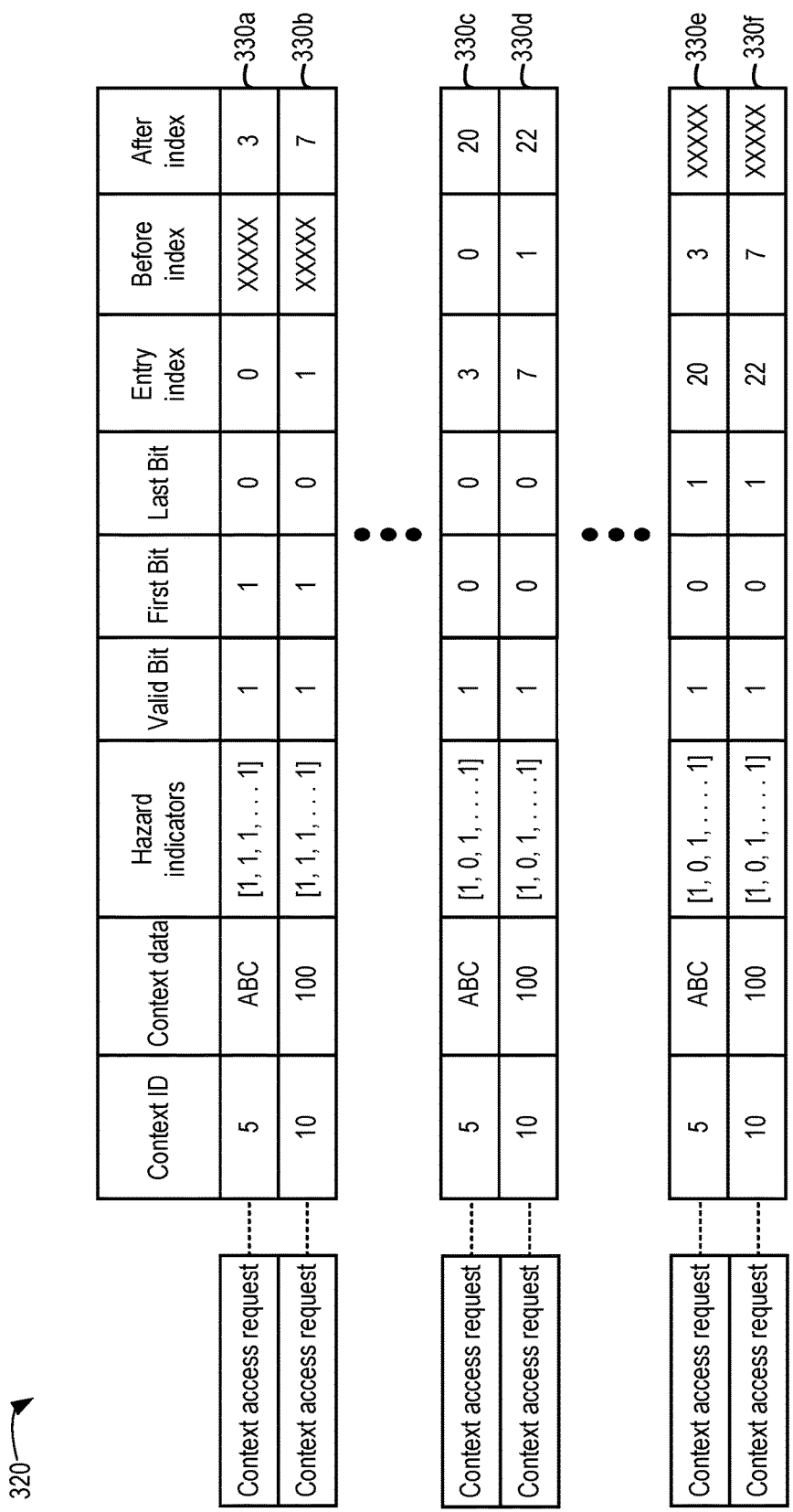
FIG. 4 shows an example of a context queue used in the system of FIG. 4, according to certain aspects of the disclosure.

Reference is now made to FIG. 4, which illustrates an example of the data structure of context queue 320, according to certain aspects of the disclosure. As shown in FIG. 4, context queue 320 can include a plurality of entries including 330a, 330b, 330c, 330d, 330e, and 330f. The entries can store context data associated with different context IDs. For example, entries 330a, 330c, and 330e can store context data associated with context ID of "5," whereas entries 330b, 330d, and 330f can store context data associated with context ID of "10." Context queue 320 further stores additional information in each entry to enable queue management module 324 to traverse and manage entries associated with the same context ID. For example, the "first bit" field indicates whether the entry is the first entry in a set of entries associated with a particular context ID. The "after index" of an entry can represent the memory address of the next entry allocated after that entry within the set. The "last bit" field indicates whether the entry is the last entry in that set of entries. Each entry also includes an entry index, which can represent the memory location of that entry. Queue management module 324 can retrieve the entry indices associated with a particular context ID from context queue 320, identify the first entry (based on the value of the "first bit"), and then traverse each entries according to the order by which the entries are allocated (based on the "after index" values) to process the associated context access requests, until the last entry (as indicated by the "last bit" value) is reached. In the example shown in FIG. 4, entry 330e is the last entry for context ID 5, while entry 330f is the last entry for context ID 10. Context queue 320 can also allocate a new entry for context ID 5 by setting the "after index" field of entry 330e to point to the new entry. Moreover, after the context data stored in an entry has been provided to data processor 303, the entry can be deleted (e.g., by setting the valid bit to zero), and the next entry can be set as the first entry (e.g., by updating the "first bit" field).

Further, each entry of context queue 320 also includes a set of data hazard indicators, each of which corresponding to an entry in the set of entries for a particular context ID. For example, assuming that context queue 320 includes ten entries for context ID 5, each entry of the set of entries associated with context ID 5 (e.g., entry 330a, 330c, and 330e) may include 10 bits. The order of the bits may also correspond to the order of the entries. For example, the most significant bit (e.g., bit 9) may correspond to the first entry (an entry with "first bit" set to 1), or vice versa. The data hazard indicators can be dynamically updated as queue management module 324 processes the context access requests, delete the entries and allocate new entries. For example, the data hazard indicators are initially set when an entry is allocated for the associated context data in response to a request for the context data from a packet processing task. The values of the data hazard indicators are updated with the requested context data is either read from the main memory, updated by the processing a previous data packet, or when the packet is being retired from the datapath. It should be noted that although the data hazard indicators indicate when the associated context data is ready to be read, the reading of the context data from context queue 320 alone does not affect the state of the data hazard indicators. Management of context queue 320 can be performed in a similar manner as described above with reference to FIGS. 2A-B.

Methods

Figure 5:
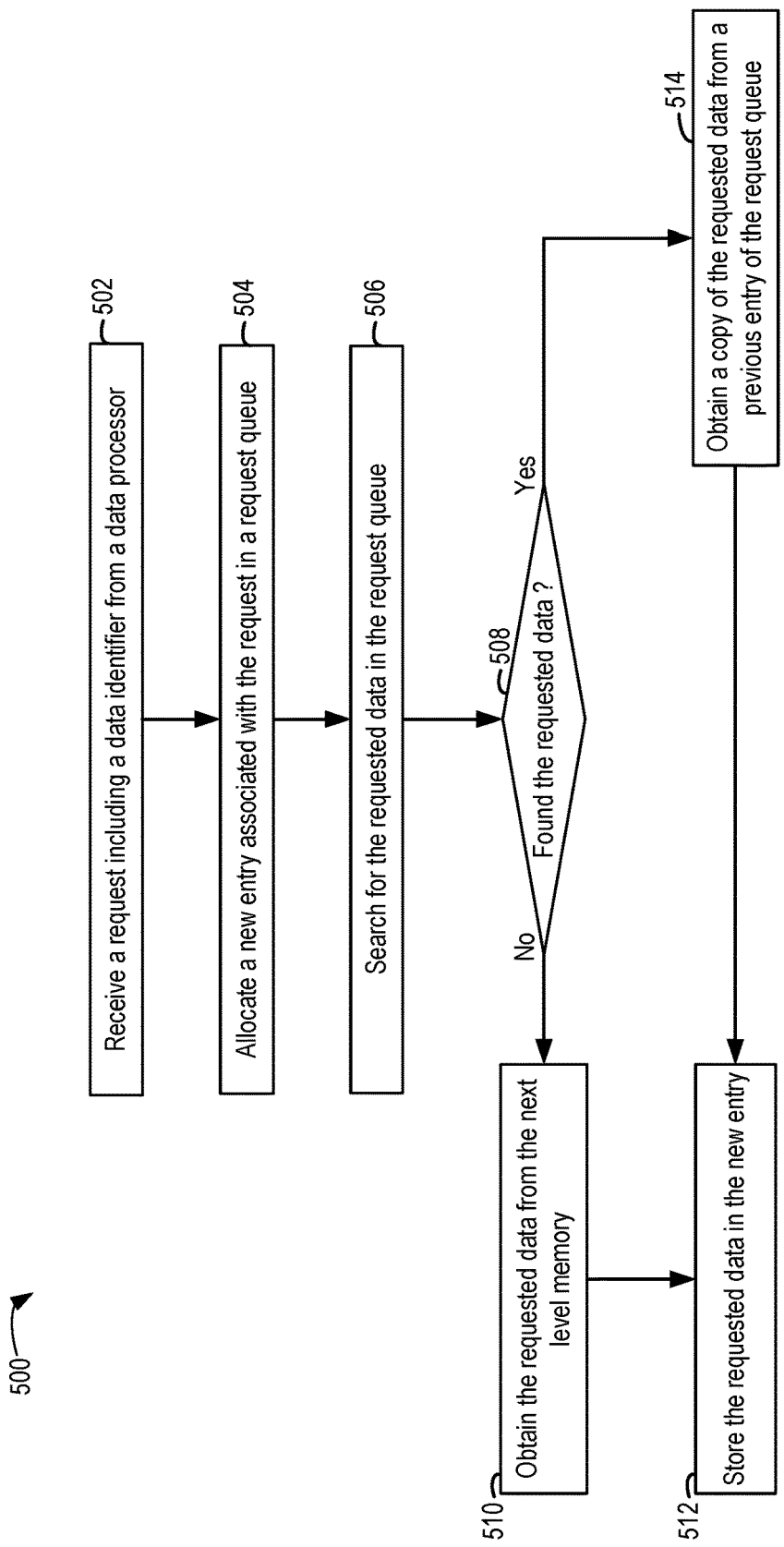
FIG. 5 shows an example of a method for coordinating access to a shared resource, according to certain aspects of the disclosure.

FIG. 5 illustrates an example of method 500 for coordinating shared access to computing resources, according to certain aspects of the disclosure. The method may be implemented by the systems described above. For example, in some embodiments, method 500 can be implemented in a data processing device such as a network interface controller. In some embodiments, method 500 can be implemented using control logic and/or instructions stored in a non-transitory computer-readable medium to be executed by a processor.

At step 502, the system receives a data access request including a data identifier (e.g., a context identifier) from a data processor. The request can be a request for shared information such as context data associated with a computing task for processing of a network data packet received at a network port, generation of a data packet for transmission at a network port, etc. In some embodiments, the request can be associated with the execution of a processor instruction, and the shared information being requested can be data (e.g., opcode information) stored in a processor register. The access request may involve a read operation, or a read operation followed by a write-back operation, etc.

At step 504, the system allocates a new entry a request queue (e.g., a context queue), and associate the new entry with the access request received at step 502. For example, the allocated entry can be associated with an entry index indicating the memory location of the entry in the request queue. In some embodiments, the request queue may include a head entry and one or more remaining entries. The request queue can be, for example, in the form of a linked list. Each entry of the linked list may be associated with a received access request, and each entry may store a copy of the data requested by the associated access request. Each entry may also store a data identifier (e.g., context identifier) associated with the requested data, a data hazard indicator or conflict indicator indicating whether the access request associated with the entry has data dependency on other access requests, as well as a valid bit that indicate whether the entry is valid. As discussed above, an entry can be invalidated (and become available to be associated with another access request) if, for example, the valid bit is set to zero after the request associated with the entry has been serviced.

At step 506, the system searches for the requested data in the request queue. The search can be based on, for example, matching the data identifier included in the access request with the data identifiers stored in the request queue, and determining whether the entries that store the matching data identifiers are valid. If the system does not find the requested data in the request queue, the system can obtain the requested data from the next level memory (e.g., context memory 312) using the identifier at step 510. The system can then store the requested data in the new entry at step 512, and provide the entry index associated with the entry to the data processor. If the allocated entry is the head entry of the request queue for the requested data, the data hazard indicator associated with the entry can be set to a value to indicate the data hazard for the request is resolved once the requested data has been stored in the allocated entry. Being at the head entry of the request queue means that either this is the first request for the shared information so that there is no data dependency on other requests, or that any prior requests has been serviced and the data dependency on previous requests should have been resolved.

When the data processor receives the entry index, the data processor can determine whether the hazard indicator associated with the entry indicates the data hazard for the request is resolved such that the requested data is available for consumption from the request queue. If the hazard indicator indicates the data hazard is resolved, the data processor can provide the entry index to read the requested data from the request queue. The request queue can then retrieve the requested data using then entry index and provide the requested data to the data processor.

On the other hand, if at step 508, the system finds the requested data in the request queue and determines that the requested data associated with the identifier is available in a previous entry of the request queue, the system can copy the data associated with the identifier stored in the previous entry of the request queue at step 514, and store the data in the new entry at step 512. Since the requested data is already available in the request queue, the new entry is not the head entry of the request queue. In such a case, the data hazard indicator associated with the entry can be set appropriately to indicate whether the data hazard for the request is resolved. For example, if the request does not require the most up-to-date data, the data hazard indication associated with the entry can be set to indicate that the data hazard for this request is resolved once the requested data has been stored in this entry. This can be done because this request for the requested data does not have data dependency on other requests. However, if the request does require the most up-to-date data, the data hazard indicator associated with the entry can be set to a value to indicate that the data hazard for this request is unresolved. The data hazard for this entry can remain unresolved until the processing of a prior request writes back the requested data.

Figure 6:
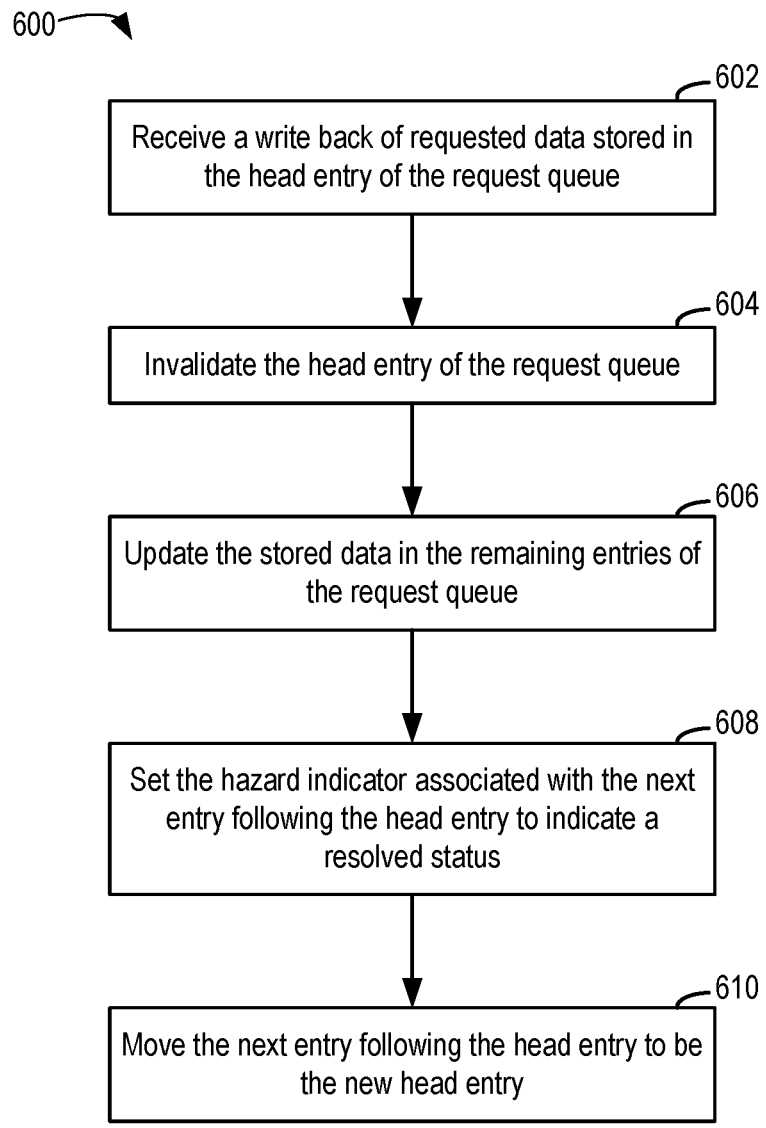
FIG. 6 shows an example of a method for write back of a shared resource, according to certain aspects of the disclosure.

FIG. 6 illustrates an example of method 600 for write-back processing of requested data, according to certain aspects of the disclosure. The method may be implemented by the systems described above. For example, in some embodiments, method 600 can be implemented in a data processing device such as a network interface controller. In some embodiments, method 600 can be implemented using control logic and/or instructions stored in a non-transitory computer-readable medium to be executed by a processor.

At step 602, the system receives a write-back operation of the requested data (e.g., context data) associated with the request corresponding to the head entry of the request queue (e.g., context queue). The write-back operation may modify the requested data associated with the data identifier of the head entry to an updated value. The write-back operation may indicate the completion of servicing the request corresponding to the head entry of the request queue. At step 604, the head entry of the request queue can be invalidated (e.g., by resetting the valid bit for the head entry) to free up the entry such that the entry can be allocated for other requests. At step 606, the requested data associated in each of the entries following the head entry that contains the data associated with the same identifier is modified to the updated value of the write-back operation. This will ensure that all subsequent requests have the most up-to-date value of the requested data. At step 608, the hazard indicator for the next entry following the head entry can be set to a value to indicate the data hazard for the request corresponding to that entry has now been resolved, because the requested data has been modified by the write-back operation. At step 610, the next entry following the head entry is converted to be the new head entry of the request queue. It should be noted that the various steps for invalidating the head entry, modifying the requested data in the remaining entries, and moving the next entry to become the new head entry can be performed in any order. Once the hazard indicator for the new head entry has a resolved status, the requested data stored in the new head entry can be provided to the data processor to execute the computing task associated with the new head entry.

Accordingly, by using the techniques described herein, access to shared information such as context data used for packet processing can be managed to avoid data conflicts and coherency issues. The techniques may include receiving multiple requests to access shared information associated with an identifier. For each of the requests, an entry in a linked list can be allocated to the request, and each entry can be associated with the identifier identifying the shared information. The shared information associated with the identifier can be retrieved, and stored in each entry associated with the identifier. A conflict indicator is set in each entry to indicate whether the shared information is available for the request corresponding to the entry. For example, the conflict indicator can be set based on whether the request is requesting the most updated shared information, and whether the entry is a head entry of the linked list. As each entry and its corresponding requests is processed, the shared information stored in the entries of the linked list can be updated as necessary. The shared information stored in each entry is provided for each request after the conflict indicator in the corresponding entry indicates the shared information is available for the request.

Computing Systems

Figure 7:
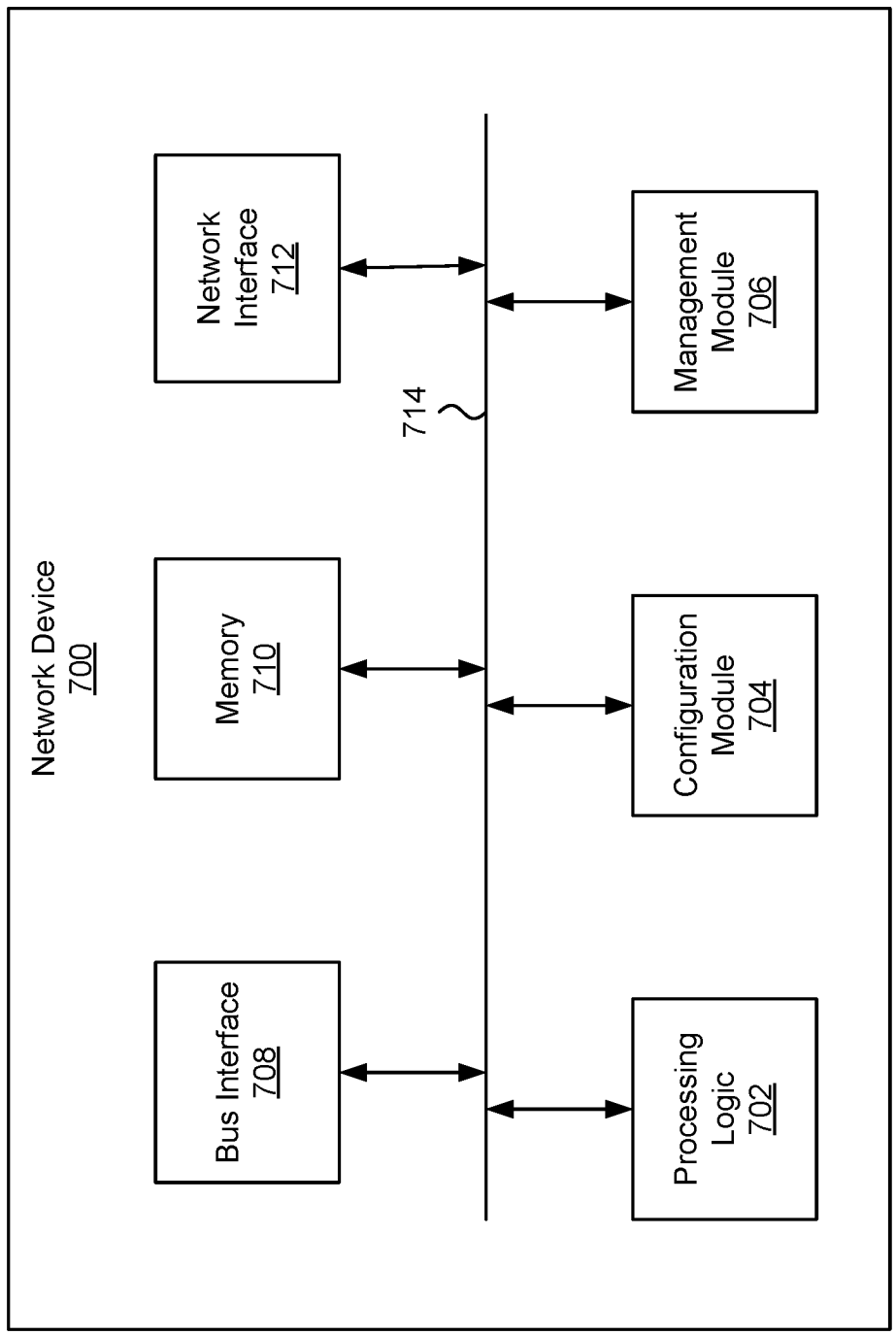
FIG. 7 shows an example of a network device, according to certain aspects of the disclosure.

FIG. 7 illustrates an example of a network device 700. Functionality and/or several components of the network device 700 may be used without limitation with other embodiments disclosed elsewhere in this disclosure, without limitations. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
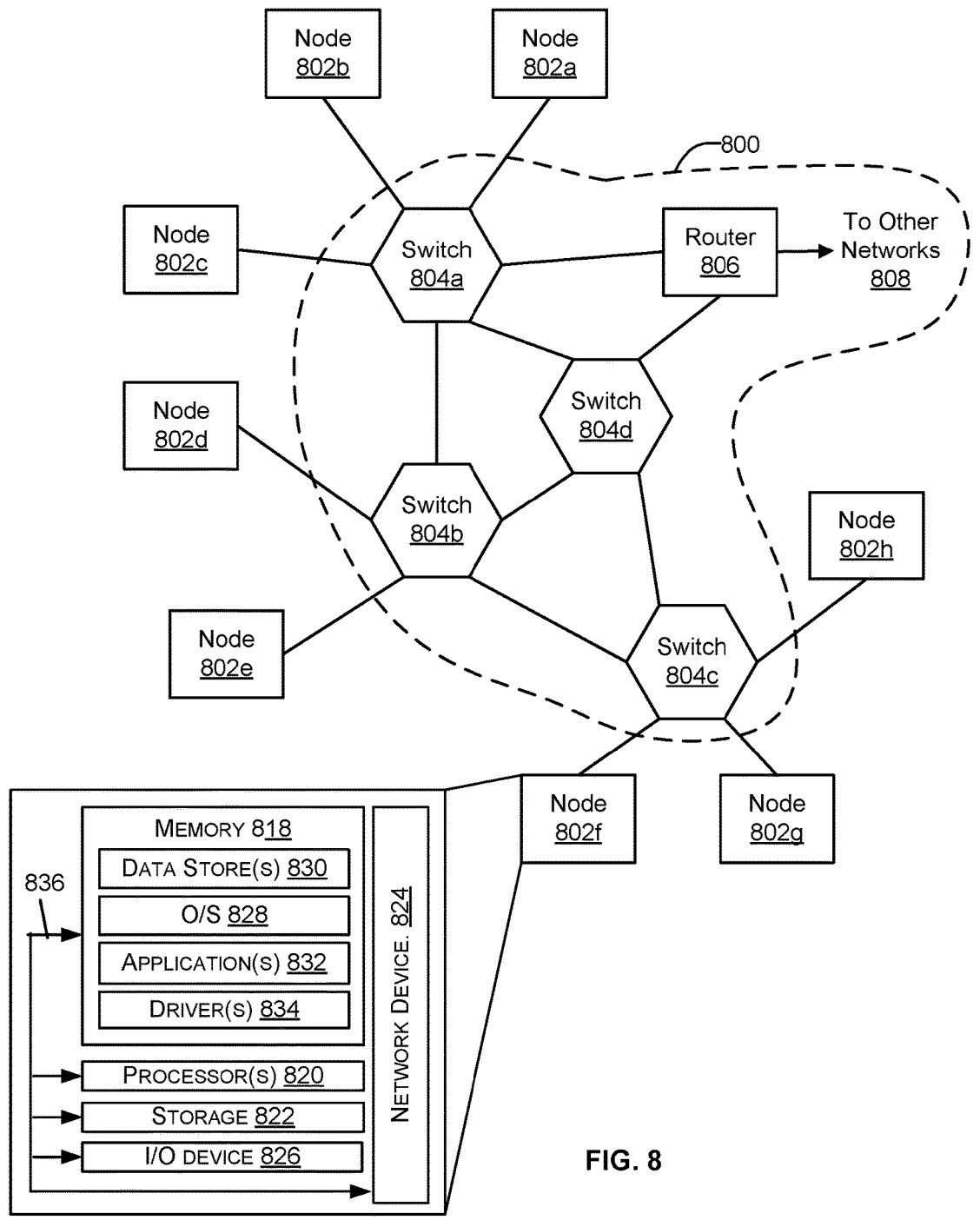
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 600 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix®, Linux®, Windows®, macOS®, iOS®, Android™ and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer-readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit comprising:
a data processor;
a context memory storing context data; and
context control logic coupled to the context memory and implementing:
  a context queue for managing requests for context data associated with a context identifier, the context queue having a plurality of entries including a head entry and one or more remaining entries; and
  a hazard vector, the hazard vector having a plurality of hazard indicators each corresponding to one of the requests to indicate whether a data hazard for that request is resolved,
wherein the context control logic is configured to:
  receive a first request from the data processor to access the context data associated with the context identifier;
  allocate a first entry in the context queue to the first request and associate the first entry with a first entry index;
  retrieve the context data associated with the context identifier from the context memory;
  store the context data in the first entry of the context queue;
  set a first hazard indicator for the first entry to indicate whether a data hazard of the context data for the first request is resolved; and
  provide the first entry index to the data processor, and
wherein the data processor is configured to:
  receive the first entry index from the context control logic;
  determine that the first hazard indicator associated with the first entry indicates the data hazard of the context data for the first request is resolved;
  provide the first entry index to the context control logic to read the context data; and
  receive the context data stored in the first entry of the context queue from the context control logic.

2. The integrated circuit of claim 1, wherein the context control logic is further configured to:
  receive a second request from the data processor to access the context data associated with the context identifier;
  allocate a second entry in the context queue to the second request;
  determine that the context data associated with the context identifier is available in the first entry of the context queue;
  copy the context data associated with the context identifier from the first entry to the second entry; and
  set a second hazard indicator associated with the second entry to indicate whether a data hazard of the context data for the second request is resolved.

3. The integrated circuit of claim 2, wherein the first hazard indicator is set to indicate the data hazard of the context data for the first request is resolved when the requested context data is stored in the context queue, and the first entry associated with the first request is the head entry of the context queue.

4. The integrated circuit of claim 2, wherein the second hazard indicator is set to indicate the data hazard of the context data for the second request is unresolved when the second request is requesting the context data that is most up to date, and the second entry associated with the second request is one of the remaining entries of the context queue.

5. The integrated circuit of claim 1, wherein the context control logic is further configured to:
  receive a write to the context data associated with a request corresponding to the head entry of the context queue to modify the context data associated with the context identifier; and
  modify the context data associated with the context identifier in each of the entries following the head entry that contains the context data associated with the context identifier.

6. The integrated circuit of claim 5, wherein the context control logic is further configured to:
  invalidate the head entry of the context queue after modifying the context data;
  convert the next entry following the head entry in the context queue to be a new head entry; and
  update a hazard indicator associated with the new head entry to indicate that a data hazard of the context data for the new head entry is resolved.

7. A computer-implemented method comprising:
  receiving a plurality of requests to access shared information associated with an identifier, the plurality of requests comprising a first request and second request;
  allocating an entry in a linked list to the first request and associating the entry with the identifier;
  retrieving the shared information associated with the identifier;
  storing the shared information in the entry associated with the identifier;
  setting a conflict indicator in the entry to indicate whether the shared information is available for the request corresponding to the entry, the conflict indicator being set based on whether the request is requesting the most updated shared information; and
  providing the shared information for the first request after the conflict indicator in the corresponding entry indicates the shared information is available for the first request.

8. The computer-implemented method of claim 7, wherein the conflict indicator of a corresponding entry is set to indicate that the shared information is available after the shared information has been stored in the corresponding entry.

9. The computer-implemented method of claim 7, wherein the conflict indicator of a corresponding entry is set to indicate that the shared information is available when the corresponding entry is a head entry of the linked list.

10. The computer-implemented method of claim 7, wherein an entry is moved to a head entry of the linked list when that entry follows a previous head entry of the linked list, and a request associated with the previous head entry of the linked list modifies the shared information.

11. The computer-implemented method of claim 7, wherein the first request is associated with processing a corresponding network packet, and the shared information being requested is context data used for processing the corresponding network packet.

12. The computer-implemented method of claim 11, wherein the context data includes a memory address, a network address, protocol information, port information, or a queue pointer.

13. The computer-implemented method of claim 11, wherein the linked list is implemented in a network interface controller.

14. The computer-implemented method of claim 7, wherein the first request is associated with execution of a processor instruction.

15. The computer-implemented method of claim 14, wherein the shared information being requested is data stored in a processor register.

16. The computer-implemented method of claim 7, wherein the linked list is implemented using a queue or a FIFO.

17. A data processing device comprising:
  a processor; and
  a non-transitory computer-readable storage medium storing a set of instructions, which when executed by the processor, causes the data processing device to:
    receive a packet for processing by the data processing device;
    parse the packet to identify context data associated with processing the packet;
    hold the packet until a hazard indicator for the context data indicates that the context data stored in an entry of a corresponding context queue is valid, the hazard indicator being set based on whether processing the packet requires the most updated context data;
    request the context data from the corresponding context queue in response to determining that the hazard indicator indicates the context data in the context queue is valid for processing the packet;
    process the packet using the context data; and
    store the processed packet in a main memory.

18. The data processing device of claim 17, wherein the context queue corresponding to the context data includes a linked list indicating a processing order of packets accessing the context data.

19. The data processing device of claim 17, wherein processing the packet includes modifying the context data.

20. The data processing device of claim 17, wherein the context data includes a memory address, a network address, protocol information, port information, or a queue pointer.

21. The data processing device of claim 17, wherein the data processing device is a network interface controller.

* * * * *